(12) United States Patent
Miyazaki et al.

(10) Patent No.: US 11,460,650 B2
(45) Date of Patent: Oct. 4, 2022

(54) OPTICAL WAVEGUIDE DEVICE, AND OPTICAL MODULATION DEVICE AND OPTICAL TRANSMISSION DEVICE USING IT

(71) Applicant: SUMITOMO OSAKA CEMENT CO., LTD., Tokyo (JP)

(72) Inventors: Norikazu Miyazaki, Tokyo (JP); Yu Nakata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 17/215,260

(22) Filed: Mar. 29, 2021

(65) Prior Publication Data
US 2021/0302674 A1   Sep. 30, 2021

(30) Foreign Application Priority Data

Mar. 31, 2020   (JP) .............................. JP2020-062120

(51) Int. Cl.
*G02B 6/42* (2006.01)
(52) U.S. Cl.
CPC .................................. *G02B 6/4286* (2013.01)
(58) Field of Classification Search
CPC ........................ G02F 2201/58; G02B 6/4286
See application file for complete search history.

(56) References Cited

U.S. PATENT DOCUMENTS

| | | | | |
|---|---|---|---|---|
| 10,338,309 B2 * | 7/2019 | Verslegers | ............. | G02B 6/122 |
| 2014/0294380 A1 * | 10/2014 | Sugiyama | ............. | G02F 1/0316 398/28 |
| 2016/0223881 A1 * | 8/2016 | Doi | ........................ | G02F 1/0036 |
| 2017/0343837 A1 | 11/2017 | Miyazaki et al. | | |
| 2019/0113779 A1 | 4/2019 | Itou et al. | | |

FOREIGN PATENT DOCUMENTS

JP     2017-187522 A    10/2017
JP     2017-211504 A    11/2017

* cited by examiner

*Primary Examiner* — Omar R Rojas
(74) *Attorney, Agent, or Firm* — IpHorgan Ltd.

(57) ABSTRACT

An optical waveguide device includes: a substrate having an electro-optic effect, an optical waveguide formed on the substrate, a light-receiving element disposed on the substrate and monitoring a light wave propagating through the optical waveguide or a light wave that is radiated from the optical waveguide; and a monitoring optical waveguide extending from the optical waveguide to the light-receiving element, in which the monitoring optical waveguide has a U-turn waveguide with respect to an output direction of the optical waveguide, and the light-receiving element is disposed at a part of the monitoring optical waveguide after the U-turn waveguide.

9 Claims, 6 Drawing Sheets

OPTICAL WAVEGUIDE DEVICE, AND OPTICAL MODULATION DEVICE AND OPTICAL TRANSMISSION DEVICE USING IT

CROSS-REFERENCE TO RELATED APPLICATIONS

This application claims the benefit of Japanese Patent Application No. 2020-062120 filed Mar. 31, 2020, the disclosure of which is herein incorporated by reference in its entirety.

BACKGROUND OF THE INVENTION

Field of the Invention

The present invention relates to an optical waveguide device, and an optical modulation device and an optical transmission device using the optical waveguide device, and in particular, to an optical waveguide device having a substrate having an electro-optic effect, an optical waveguide formed on the substrate, and a light-receiving element disposed on the substrate and monitoring a light wave propagating through the optical waveguide or a light wave that is radiated from the optical waveguide.

Description of Related Art

In the field of optical communication or the field of optical measurement, an optical waveguide device such as an optical modulator, in which an optical waveguide is formed on a substrate having an electro-optic effect, such as lithium niobate (LN), is often used. Further, in an optical modulator or the like, in order to control a bias in optical modulation by a Mach-Zehnder type optical waveguide, monitoring of output light or a radiated light beam that is output from a Y-junction of the Mach-Zehnder type optical waveguide is performed.

Figure 1:
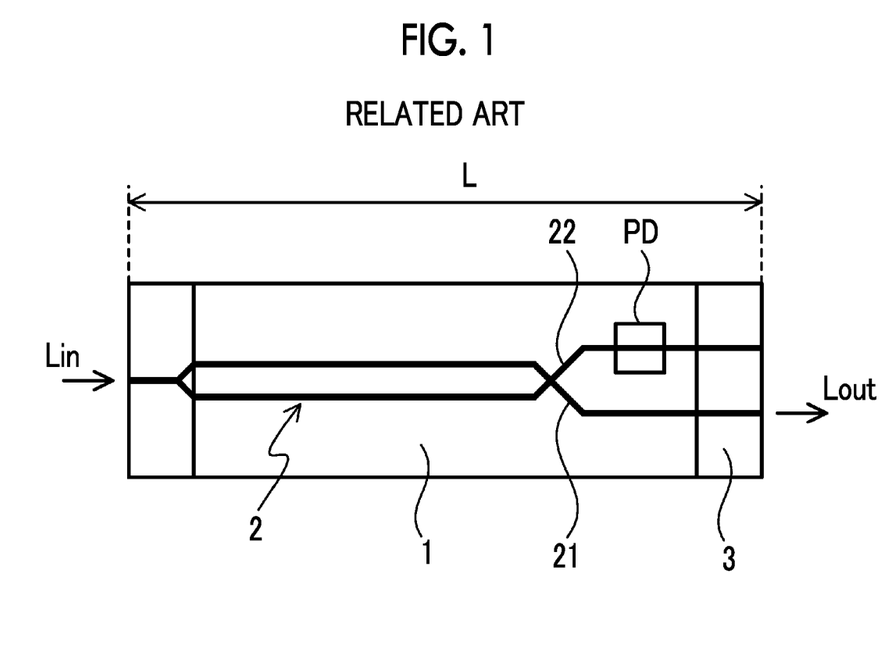
FIG. 1 is a plan view showing an optical waveguide device of the related art.

As in Japanese Laid-open Patent Publication No. 2017-211504, a light-receiving element such as a PD is disposed on a substrate. As shown in FIG. 1, interference light in a Y-junction of a Mach-Zehnder type optical waveguide 2 formed on a substrate 1 is led out as output light to the outside of the substrate 1 by an output waveguide 21. Further, light having complementary light intensity generated with interference in the Y-junction is used as monitor light by a monitoring optical waveguide 22 and is guided to the light-receiving element PD.

Disposition of such a light-receiving element is widely used in a bipolarized optical modulator in which a plurality of Mach-Zehnder type optical waveguides that are used in coherent communication are disposed in parallel, because there is no loss of output light, sufficient monitor sensitivity can be obtained, and a small-sized optical modulator can be realized by disposing a plurality of light-receiving elements on a substrate.

By disposing the light-receiving element on the substrate, it is possible to reduce the size of the optical waveguide device to some extent. However, in recent years, need for further downsizing has been increased. In particular, it is required to further shorten a length L of the substrate 1 on which the Mach-Zehnder type optical waveguide 2 is formed, as shown in FIG. 1. Therefore, it is necessary to shorten the distance from the Y-junction of the Mach-Zehnder type optical waveguide to the output end of the optical waveguide, and thus it is difficult to secure a disposition position of the light-receiving element PD.

Further, as in Japanese Laid-open Patent Publication No. 2017-187522, a reinforcing member is disposed on a part of the substrate. As shown in FIG. 1, reinforcing members 3 are disposed on the upper side of the substrate along the sides of the substrate 1 at an input end where input light (Lin) enters the optical waveguide and an output end where output light (Lout) exits. This is for preventing waveguide chipping when polishing the end surface of the input end or the output end of the optical waveguide, or for securing a bonding area when an optical component such as an optical fiber or a lens is bonded and fixed to face the input end or the output end.

An adhesive is used for joining of the light-receiving element PD and the substrate 1, or joining of the reinforcing member 3 and the substrate 1. At the time of the joining of the light-receiving element or the reinforcing member 3, there is a possibility that the adhesive may protrude from the light-receiving element or the reinforcing member and hinder the joining of the other. Therefore, in order to make a configuration so as to prevent the adhesives used in the respective members from coming into contact with each other, it is necessary to widen the clearance between the light-receiving element PD and the reinforcing member 3. This makes it even more difficult to shorten the length L of the substrate 1 in FIG. 1.

SUMMARY OF THE INVENTION

An object of the present invention is to solve the problems as described above and provide an optical waveguide device in which it is possible to sufficiently secure a space necessary for disposing alight-receiving element while shortening a length of a substrate having an electro-optic effect, and an optical modulation device and an optical transmission device using the optical waveguide device.

In order to solve the above problems, an optical waveguide device, an optical modulation device, and an optical transmission device according to the present invention have the following technical features.

(1) An optical waveguide device includes: a substrate having an electro-optic effect; an optical waveguide formed on the substrate; a light-receiving element disposed on the substrate and monitoring a light wave propagating through the optical waveguide or a light wave that is radiated from the optical waveguide; and a monitoring optical waveguide that extends from the optical waveguide to the light-receiving element, in which the monitoring optical waveguide has a U-turn waveguide with respect to an output direction of the optical waveguide, and the light-receiving element is disposed at a part of the monitoring optical waveguide after the U-turn waveguide.

(2) In the optical waveguide device according to the above (1), a reinforcing member is joined to the substrate on an upper side of the substrate and along one side of the substrate at which an output end of the optical waveguide is disposed, and the U-turn waveguide is formed between the substrate and the reinforcing member.

(3) In the optical waveguide device according to the above (1) or (2), an input end and an output end of the optical waveguide are disposed along the same side of the substrate.

(4) In the optical waveguide device according to the above (3), the light-receiving element is disposed outside a range of a spread angle of a leaked light beam leaking from the input end to the substrate.

(5) In the optical waveguide device according to the above (2), a light-shielding part is formed on a side surface of the reinforcing member facing the light-receiving element or a side surface of the light-receiving element facing the reinforcing member.

(6) In the optical waveguide device according to any one of the above (1) to (5), the monitoring optical waveguide is a rib-type optical waveguide.

(7) An optical modulation device includes: the optical waveguide device according to any one of above (1) to (6); a case that houses the optical waveguide device; and an optical fiber that inputs a light wave from an outside of the case to the optical waveguide or outputs the light wave from the optical waveguide to the outside of the case.

(8) In the optical modulation device according to the above (7), an electronic circuit for amplifying a modulation signal that is input to the optical waveguide device is provided inside the case.

(9) An optical transmission device includes: the optical modulation device according to the above (7) or (8); and an electronic circuit that outputs a modulation signal that causes the optical modulation device to perform a modulation operation.

According to the present invention, the optical waveguide device includes: a substrate having an electro-optic effect; an optical waveguide formed on the substrate; a light-receiving element disposed on the substrate and monitoring a light wave propagating through the optical waveguide or a light wave that is radiated from the optical waveguide; and a monitoring optical waveguide that extends from the optical waveguide to the light-receiving element, in which the monitoring optical waveguide has a U-turn waveguide with respect to an output direction of the optical waveguide and the light-receiving element is disposed at a part of the monitoring optical waveguide after the U-turn waveguide. Therefore, it is possible to provide an optical waveguide device in which it is possible to sufficiently secure a space necessary for disposing a light-receiving element while shortening the length of a substrate having an electro-optic effect, and an optical modulation device and an optical transmission device using the optical waveguide device.

DETAILED DESCRIPTION OF THE INVENTION

Hereinafter, the present invention will be described in detail with reference to preferred examples.

Figure 2A:
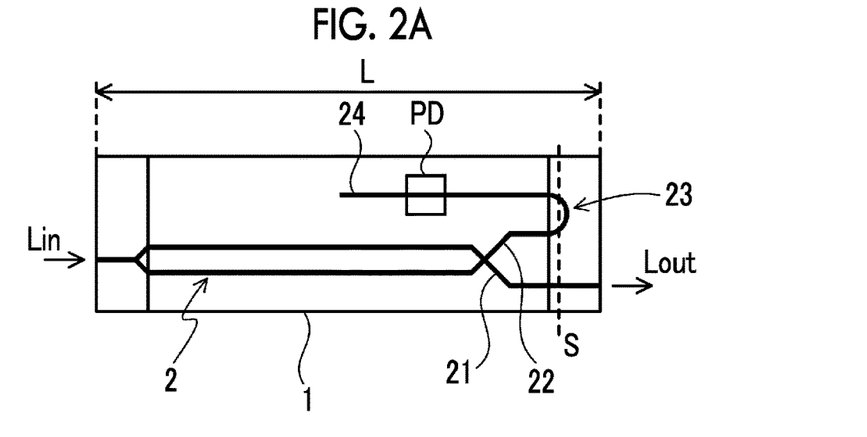
FIG. 2A and FIG. 2B respectively are a plan view and aside view showing a first example of an optical waveguide device according to the present invention.
Figure 2B:
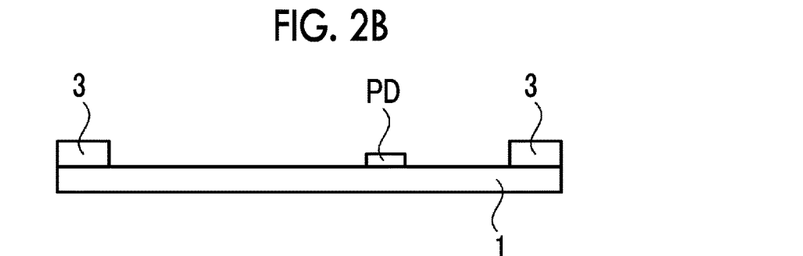

As shown in FIG. 2A to FIG. 2D, the present invention provides an optical waveguide device including a substrate 1 having an electro-optic effect, an optical waveguide 2 formed on the substrate, a light-receiving element (PD) disposed on the substrate and monitoring a light wave propagating through the optical waveguide or a light wave that is radiated from the optical waveguide, and a monitoring optical waveguide 22 extending from the optical waveguide to the light-receiving element, in which the monitoring optical waveguide has a U-turn waveguide 23 with respect to an output direction of the optical waveguide, and the light-receiving element is disposed at a part (24) of the monitoring optical waveguide after the U-turn waveguide. FIG. 2A is a plan view, and FIG. 2B is a side view.

As the substrate 1 having an electro-optic effect, a substrate made of lithium niobate (LN), lithium tantalate (LT), PLZT (lead lanthanum zirconate titanate), or the like, a composite substrate obtained by bonding vapor phase growth films by these materials or these materials to different types of substrates, or the like can be used.

Further, various materials such as semiconductor materials or organic materials can also be used as the optical waveguide.

As a method of forming the optical waveguide, it is possible to use a rib-type optical waveguide in which a portion corresponding to an optical waveguide of a substrate is formed in a protrusion shape by etching the surface of the substrate other than the optical waveguide, forming grooves on both sides of the optical waveguide, or the like. Further, it is also possible to form an optical waveguide by forming a high refractive index portion on the surface of a substrate by a thermal diffusion method, a proton exchange method, or the like of Ti or the like. It is also possible to form a composite optical waveguide by diffusing a high refractive index material in a rib-type optical waveguide portion, or the like. In particular, since the U-turn waveguide of the monitoring optical waveguide has a small radius of curvature, it is preferable to adopt a rib-type optical waveguide structure in which light is strongly confined.

The thickness of the substrate on which the optical waveguide is formed is set to 10 μm or lower, more preferably 5 μm or lower, in order to achieve velocity matching between a microwave of a modulation signal and a light wave. Further, the ratio h/t of the height h of the rib-type optical waveguide (from a bottom side of each of the grooves on both sides of the rib-type optical waveguide to a top side of a protrusion portion of the rib-type optical waveguide) and the substrate thickness t of the rib-type optical waveguide portion (from a bottom surface of the substrate to the top side of the protrusion portion of the rib-type optical waveguide) is set to 0.8 or lower. In particular, in a case where the substrate thickness t is 1 μm or lower, it is preferable that the ratio h/t is set to a value in the range from 0.6 to 0.8. Further, it is also possible to form a vapor phase growth film on a reinforcing substrate and process the film into the shape of the optical waveguide as described above.

The substrate on which the optical waveguide is formed is bonded and fixed to the reinforcing substrate through direct joining or an adhesive layer such as resin in order to increase mechanical strength. As the reinforcing substrate to be directly joined, a material having a refractive index lower than that of the optical waveguide or the substrate on which the optical waveguide is formed and having a coefficient of thermal expansion close to that of the optical waveguide or the like, for example, quartz or the like, is suitably used. In addition, it is also possible to use a reinforcing substrate having a refractive index equal to or higher than that of the substrate on which the optical waveguide is formed. In that case, a layer having a low refractive index is formed between the reinforcing substrate and the optical waveguide substrate.

Further, when joining the substrate to the reinforcing substrate through the adhesive layer, it is also possible to use an LN substrate or the like as the reinforcing substrate.

In a case where the optical waveguide device is used as an optical modulation device, a modulation electrode is formed along a branched waveguide of the optical waveguide, particularly the Mach-Zehnder type optical waveguide, in order to modulate a light wave propagating through the optical waveguide. Further, in order to control a DC bias of the optical modulation device, it is also possible to dispose a bias electrode separately from the modulation electrode.

The feature of the optical waveguide device of the present invention is that, as shown in FIG. 2A to FIG. 2D, the U-turn waveguide 23 is provided in the middle of the monitoring optical waveguide 22 that is connected from the optical waveguide 2 to the light-receiving element PD, so that the length L of the substrate 1 is shortened. Further, the U-turn waveguide 23 is disposed between a reinforcing member 3 disposed along the end surface of the substrate 1 and the substrate 1, in other words, the U-turn waveguide 23 is disposed such that the reinforcing member 3 and at least a part of the U-turn waveguide 23 overlap, as shown in FIG. 2A when viewed in a plan view. In this way, the length L of the substrate 1 can be made shorter.

Further, since the U-turn waveguide 23 can be formed at a wide portion including the lower side of the reinforcing member 3, it is possible to increase the radius of curvature so as to suppress a propagation loss of light due to bending at the U-turn waveguide.

Figure 2C:
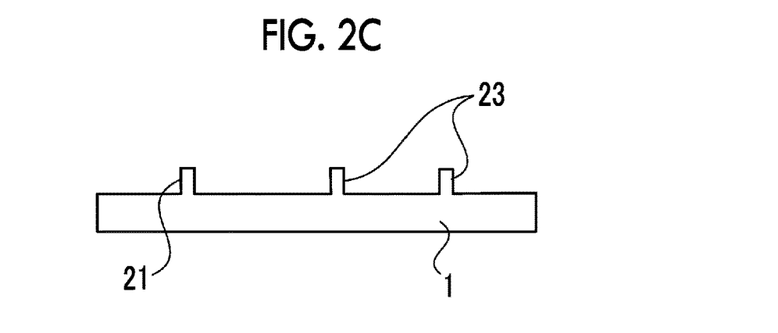
FIG. 2C and FIG. 2D are sectional views taken along a dotted line S of FIG. 2A.
Figure 2D:
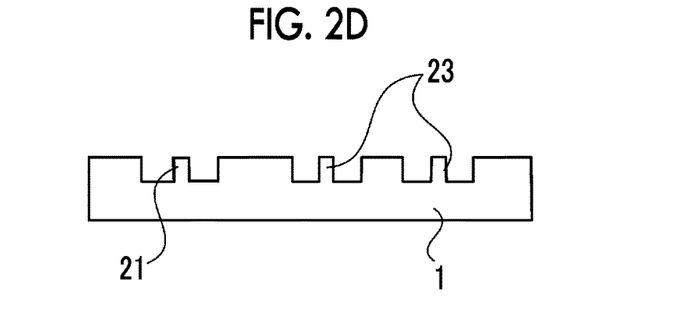

The optical waveguide (U-turn waveguide or input/output waveguide) that is located on the lower side of the reinforcing member 3 can use a structure (groove) in which a portion other than the rib-type optical waveguide is cut off, as shown in FIG. 2C, or a rib-type optical waveguide in which grooves each having a certain width are formed on both sides of the optical waveguide, as shown in FIG. 2D. The width of the groove is preferably set to a value in the range of about 1 to 10 times the width of the rib-type optical waveguide. FIG. 2C and FIG. 2D are sectional views taken along a dotted line S in FIG. 2A and show the shape of the optical waveguide formed on the substrate 1.

In this way, the U-turn waveguide or the input/output waveguide can secure a sufficient bonding area between the reinforcing member 3 and the substrate 1 while maintaining a function as a rib-type optical waveguide having a large effect of confining a light wave. Further, there is also no concern that the reinforcing member 3 may be tilted with respect to the joining surface of the substrate 1 at the time of joining. Further, in this way, a stable adhesive layer thickness can be maintained regardless of the cross section or pattern shape of the waveguide, variation in adhesive strength can be reduced, and squeezing-out of the adhesive from the reinforcing member can be controlled.

As shown in FIG. 2A, the distance between the light-receiving element PD and the reinforcing member 3 can also be set longer than the distance between a Y-junction of the Mach-Zehnder type waveguide (a Y-junction where a light wave to be detected by the light-receiving element is generated) and the reinforcing member 3. In this way, it becomes possible to prevent the adhesives for fixing the reinforcing member 3 and the light-receiving element PD to the substrate 1 from coming into contact with each other, while securing the length of an action portion for performing optical modulation or the like, which is as long as possible.

Figure 3A:
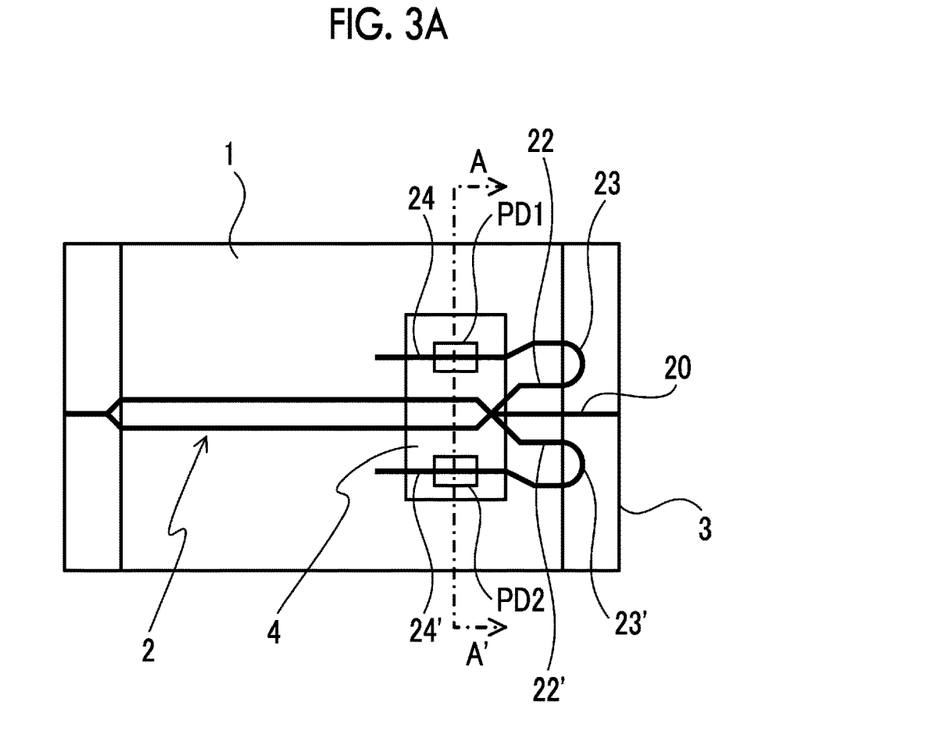
FIG. 3A and FIG. 3B respectively are a plan view and a sectional view showing a second example of an optical control element according to the present invention.
Figure 3B:
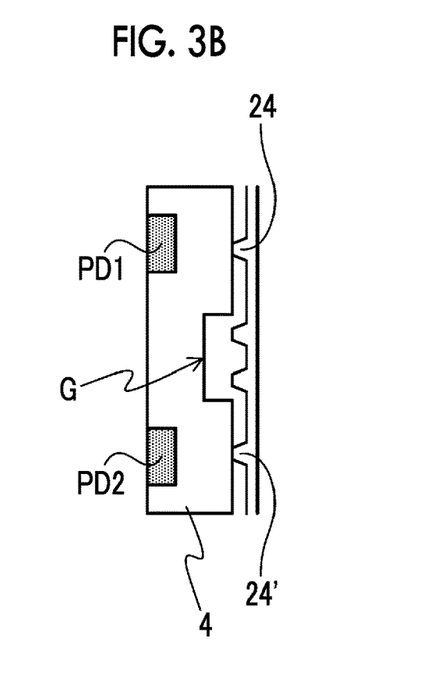

In FIG. 3A and FIG. 3B, monitoring optical waveguides (22, 22') for monitoring a radiated light beam are provided so as to interpose an output waveguide 20 of the Mach-Zehnder type optical waveguide therebetween. FIG. 3A is a plan view, and FIG. 3B is a sectional view taken along a dashed-dotted line A-A' in FIG. 3A.

The two monitoring optical waveguides are provided with U-turn waveguides (23, 23') and extend to monitoring optical waveguides (24, 24') that pass under light-receiving elements (PD1, PD2). Further, it is also possible to configure the light-receiving element (PD1) and the light-receiving element (PD2) as separate bodies and dispose each of the light-receiving element (PD1) and the light-receiving element (PD2) on each of the monitoring optical waveguide (24, 24'). However, it is also possible to integrally form the light-receiving element (PD1) and the light-receiving element (PD2) in a single support member 4. In a case where a three-branched structure is used for the Y-junction of the Mach-Zehnder type optical waveguide, by forming single monitor output by combining the outputs of the two light-receiving elements, it is possible to reduce the mixing-in of the monitor light to the output light, and to reduce a shift of a modulation curve between the monitor light and the output light while obtaining a high ON/OFF extinction ratio.

In a case of integrating the light-receiving elements (PD1, PD2) with the support member 4, as shown in FIG. 3B, it is necessary to dispose the support member 4 so as to straddle the branched waveguide of the Mach-Zehnder type optical waveguide, and therefore, it is preferable to form a recess portion G in a part of the support member 4. Further, a configuration may be made such that a buffer layer is formed on the branched waveguide, and thus the light wave is not absorbed to the light-receiving element side.

In order to guide at least apart of the light wave propagating through the monitoring optical waveguide to the light-receiving element (PD), the light-receiving element is disposed in close contact with the optical waveguide, as shown in FIG. 3B, whereby it becomes possible to suck up an evanescent component from the optical waveguide in a direction of the light-receiving element. Further, it is also possible to make a configuration such that an incision or the like in an oblique direction is formed in a part of the optical waveguide, and thus the light wave is reflected and scattered in the direction of the light-receiving element.

Further, a configuration may be made such that a reflective surface is formed on the side surface, the upper and lower surfaces, or the inside of the support member 4, and thus the light wave is reflected in the support member to improve the light receiving sensitivity of the light-receiving element. In particular, in a case where a reflective surface is formed on the inside of the support member 4, it is possible to suppress input of the light wave from one of the light-receiving element (PD1) and the light-receiving element (PD2) to the other, and therefore, it is possible to receive more stable monitor light.

Further, in order to stabilize the light receiving amount or characteristics of the monitor light and to improve the reliability of fixing of the light-receiving element, a pedestal structure may be separately provided on the lower surface of the light-receiving element (PD).

Figure 4:
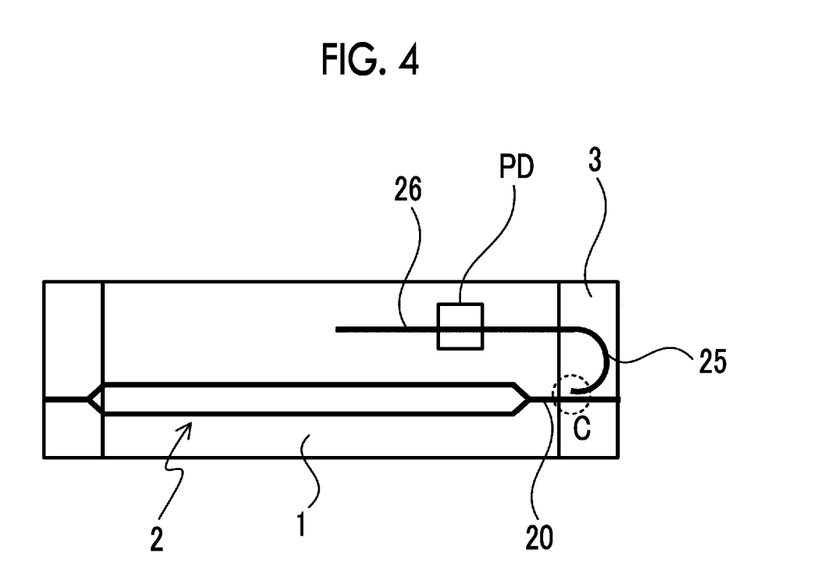
FIG. 4 is a plan view showing a third example of the optical control element according to the present invention.

FIG. 4 shows an example in which the light wave that is monitored by the light-receiving element PD is a part of the output light from the Y-junction. A configuration is made such that an optical coupler (dotted line portion C) is disposed at a part of the output waveguide 20 and a part of the output light is led to the monitoring optical waveguide. As the optical coupler C, various configurations such as a directional coupler, an MMI coupler, or a cross coupler can be adopted.

Figure 5A:
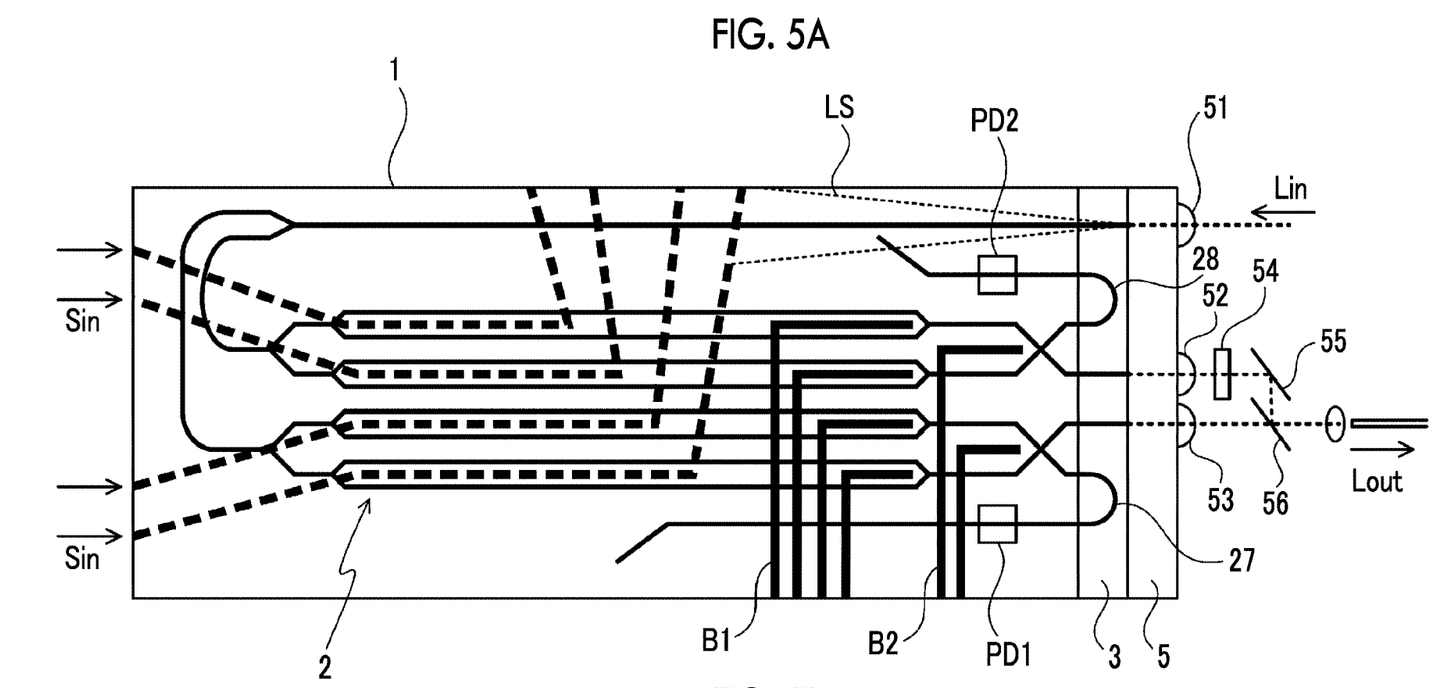
FIG. 5A and FIG. 5B respectively are a plan view and aside view showing a fourth example of the optical control element according to the present invention.
Figure 5B:
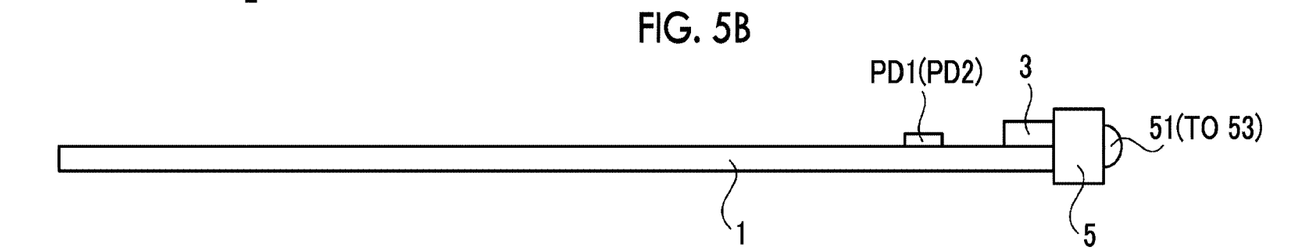

In FIG. 5A and FIG. 5B, the input end and the output end of the optical waveguide are disposed along the same side (the right side in the drawings) of the substrate 1. Further, a configuration is made such that an input light wave (Lin) is branched into two light waves, which are then modulated by the respective nested optical waveguides, and the two modulated lights are polarization-combined and output as one output light (Lout). Further, an electrical signal (Sin) that is used for optical modulation is input from a side on the side opposite to the side of the substrate 1 to and from which the light wave is input and output. FIG. 5B is a side view with respect to a plan view of FIG. 5A.

A lens 51 that is provided on the input side of the light wave or lenses (52, 53) that are provided on the output side are integrally held by an optical block 5 and joined to the side surfaces of the substrate 1 and the reinforcing member 3. Further, if necessary, it is also possible to provide an optical block that integrally holds optical components such as a wave plate 54 and polarization combining members (55, 56). Further, it is also possible to directly join the end surface of an optical fiber inserted and fixed to a member such as a capillary to the side surfaces of the substrate 1 and the reinforcing member 3 together with the capillary.

As an electrode that is disposed on the substrate 1, a modulation electrode (a portion indicated by a thick dotted line in the drawing, in which only a signal electrode is shown and a ground electrode is omitted) to which the electrical signal Sin is input, a bias electrode (B2) for controlling a bias of a main Mach-Zehnder type optical waveguide of the nested optical waveguide, or a bias electrode (B1) for controlling a bias of a sub-Mach-Zehnder type optical waveguide is provided.

A dotted line LS drawn on the input side of the optical waveguide 2 indicates a leaked light beam of the light wave input from the end surface of the substrate 1, and a spread angle (divergence angle $\theta$) of the leaked light beam is calculated by $\theta = \lambda/\pi w0$ from a beam radius w0 and a wavelength $\lambda$ at an optical coupling part. The light-receiving element is disposed outside the range of the spread angle of the leaked light beam, whereby it becomes possible to restrain non-coupled light at an input coupling part from being input to the light-receiving element to become noise of the light-receiving element.

In FIG. 5A, the shape of a termination of the monitoring optical waveguide is bent so as to face the side surface side of the substrate 1 (the upper and lower sides of the substrate 1 in the drawing). This is for preventing a light wave (unnecessary light) that is emitted from the termination of the monitoring optical waveguide from being input to the optical waveguide 2 again. It is also possible to absorb the light wave by an electrode formed on the surface of the substrate 1. However, it is also possible to emit the light wave from the side surface of the substrate 1 to the outside.

Figure 6A:
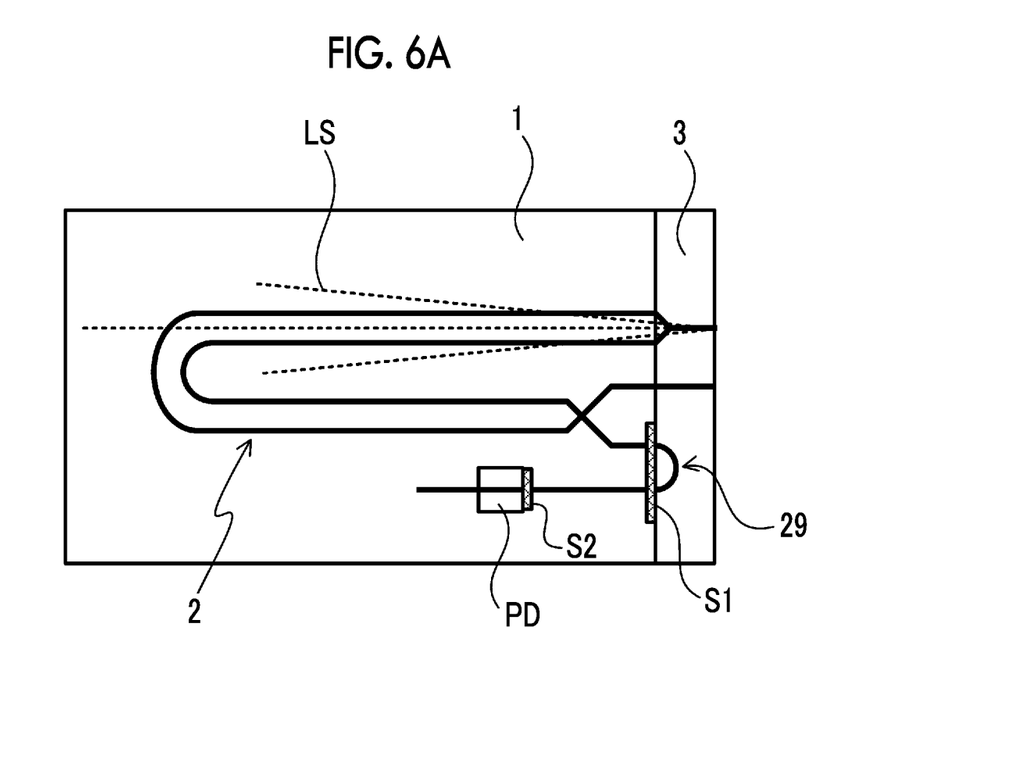
FIG. 6A and FIG. 6B respectively are a plan view and aside view showing a fifth example of the optical control element according to the present invention.
Figure 6B:
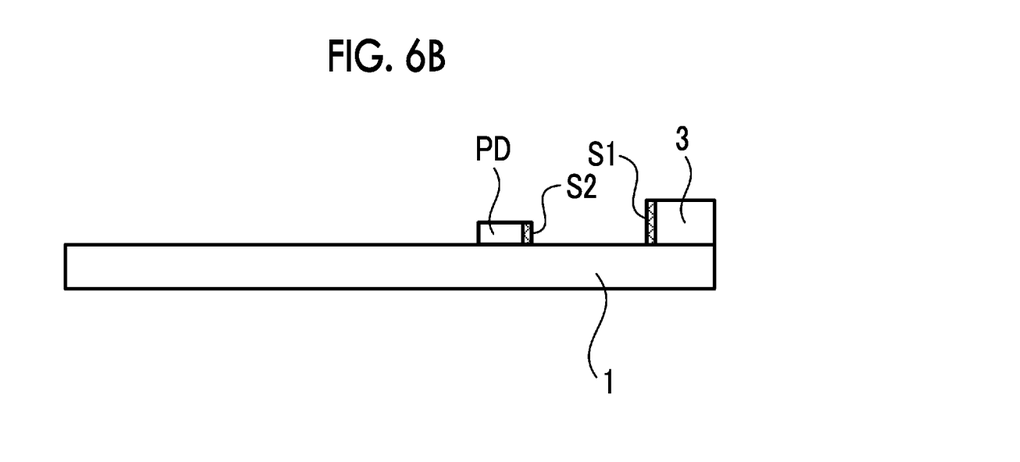

In FIG. 6A and FIG. 6B, similar to FIG. 5A and FIG. 5B, the light-receiving element PD is disposed so as to avoid the leaked light beam LS from the input end of the optical waveguide. Further, a light-shielding part is formed on the side surface of the light-receiving element PD or the reinforcing member 3, so that it is possible to restrain unnecessary light from being input to the light-receiving element, or the unnecessary light from being reflected on the side surface of the reinforcing member to be input to the optical waveguide 2 or the light-receiving element PD.

An optical modulation device can be configured by housing the optical waveguide device as described above in a case and providing optical fibers for inputting a light wave from the outside of the case to an optical waveguide of the optical waveguide device and outputting the light wave from the optical waveguide to the outside of the case. Further, it is also possible to incorporate an electronic circuit such as a driver IC for driving a modulator in the case. In particular, in the case of a waveguide having a U-turn waveguide configuration as shown in FIG. 5A and FIG. 5B, or FIG. 6A and FIG. 6B, a modulation device having excellent high-frequency characteristics can be realized by linearly disposing an interface for a high-frequency signal, a driver IC, and a modulation element.

Further, by providing the optical modulation device with an electronic circuit such as a digital signal processing processor or a driver IC for generating an electrical signal to be input to a modulation electrode formed on a substrate of the optical waveguide device, a laser light source, a control circuit, or the like, it becomes possible to configure an optical transmission device. This electronic circuit may be disposed in the same case as the optical waveguide device, or may be disposed outside the case.

As described above, according to the present invention, it becomes possible to provide an optical waveguide device in which it is possible to sufficiently secure a space necessary for disposing a light-receiving element while shortening the length of a substrate having an electro-optic effect, and an optical modulation device and an optical transmission device using the optical waveguide device.

What is claimed is:

1. An optical modulation device comprising:
   a substrate having an electro-optic effect;
   an optical waveguide formed on the substrate and having a Mach-Zehnder type optical waveguide;
   a modulation electrode formed along a branched waveguide of the Mach-Zehnder type optical waveguide;
   a light-receiving element disposed on the substrate and monitoring a light wave outputted from a Y-junction of the Mach-Zehnder type optical waveguide or a light wave that is radiated from the Y-junction; and
   a monitoring optical waveguide that is formed on the substrate, extends from the optical waveguide connected to the Y-junction or the Y-junction to the light-receiving element and is terminated after the light-receiving element,
   wherein the monitoring optical waveguide has a U-turn waveguide with respect to an output direction of the optical waveguide, and
   the light-receiving element is disposed at a part of the monitoring optical waveguide after the U-turn waveguide.

2. The optical modulation device according to claim 1, wherein a reinforcing member is joined to the substrate on an upper side of the substrate and along one side of the substrate at which an output end of the optical waveguide is disposed, and the U-turn waveguide is formed between the substrate and the reinforcing member.

3. The optical modulation device according to claim 1, wherein an input end and an output end of the optical waveguide are disposed along the same side of the substrate.

4. The optical modulation device according to claim 3, wherein the light-receiving element is disposed outside a range of a spread angle of a leaked light beam leaking from the input end to the substrate.

5. The optical modulation device according to claim 2, wherein a light-shielding part is formed on a side surface of the reinforcing member facing the light-receiving element or on a side surface of the light-receiving element facing the reinforcing member.

6. The optical modulation device according to claim 1, wherein the monitoring optical waveguide is a rib-type optical waveguide.

7. An optical modulation device comprising:
the optical modulation device according to claim 1;
a case that houses the optical modulation device; and
an optical fiber that inputs a light wave from an outside of the case to the optical waveguide or outputs the light wave from the optical waveguide to the outside of the case.

8. The optical modulation device according to claim 7, wherein an electronic circuit for amplifying a modulation signal that is input to the optical modulation device is provided inside the case.

9. An optical transmission device comprising:
the optical modulation device according to claim 7; and
an electronic circuit that outputs a modulation signal that causes the optical modulation device to perform a modulation operation.

* * * * *